United States Patent [19]

Pondo

[11] Patent Number: 5,736,268

[45] Date of Patent: Apr. 7, 1998

[54] HIGH TEMPERATURE FUEL CELL STACK POWER BUS

[75] Inventor: Joseph M. Pondo, Bolingbrook, Ill.

[73] Assignee: M-C Power Corporation, Burr Ridge, Ill.

[21] Appl. No.: 721,366

[22] Filed: Sep. 26, 1996

[51] Int. Cl.⁶ .................................................. H01M 8/02
[52] U.S. Cl. ........................................ 429/12; 429/34
[58] Field of Search ............................ 429/12, 34, 26, 429/16

[56] References Cited

U.S. PATENT DOCUMENTS

| | | |
|---|---|---|
| 4,405,697 | 9/1983 | Rowlette . |
| 4,431,714 | 2/1984 | Myerhoff . |
| 4,431,715 | 2/1984 | Isenberg . |
| 4,490,445 | 12/1984 | Hsu . |
| 4,719,157 | 1/1988 | Tsutsumi et al. . |
| 4,721,556 | 1/1988 | Hsu . |
| 4,728,585 | 3/1988 | Briggs . |
| 5,009,968 | 4/1991 | Guthrie et al. . |
| 5,034,290 | 7/1991 | Sands et al. . |
| 5,175,062 | 12/1992 | Farooque et al. . |
| 5,298,138 | 3/1994 | Nachles et al. . |

*Primary Examiner*—Anthony Skapars
*Attorney, Agent, or Firm*—Speckman, Pauley & Fejer

[57] ABSTRACT

A fuel cell stack power bus system which includes a plurality of current collectors mounted to the peripheral edge portion of a fuel cell stack end plate. The current collectors form lapped connections with a layered power bus which can be easily positioned to extend from any side of a fuel cell stack and which has improved heat transfer characteristics.

8 Claims, 1 Drawing Sheet

HIGH TEMPERATURE FUEL CELL STACK POWER BUS

BACKGROUND OF THE INVENTION

1. Field of the Invention

This invention relates to a fuel cell stack power bus system which includes a plurality of current collectors detachably mounted to an edge portion of a fuel cell stack end plate and a layered power bus mounted with respect to the current collectors.

2. Description of Prior Art

Fuel cells include a cathode electrode, an anode electrode, and an electrolyte positioned between the two electrodes. An electrochemical reaction between a fuel, an oxidant and the electrolyte causes a current to flow in an external circuit connected to the electrodes.

Fuel cell stacks are constructed from a plurality of serially connected fuel cells. An end plate is positioned on each end of the fuel cell stack and the entire stack is typically subjected to a compressive force to maintain electrical connectivity between the fuel cells as they heat to their normal operating temperature. Molten carbonate fuel cell stacks can reach temperatures in excess of 700° C.

A power bus is typically in electrical communication with each end plate to provide an electric current for a load. Conventional fuel cell stacks often have a power bus system which is integral with the end plates and can not be easily repositioned to extend from a particular side of the fuel cell stack, if necessary.

Conventional fuel cell stack end plates are often constructed from materials having a relatively low conductivity such as stainless steel. Power buses, on the other hand, are typically constructed from material having a relatively high conductivity such as copper. To ensure efficient electrical current transfer from a fuel cell stack's end plate to a power bus a relatively large contact area is desired to compensate for the differences in conductivity of the end plate material and the power bus material.

Molten carbonate fuel cell stacks, as discussed above, can reach operating temperatures in excess of 700° C. Further, they tend to result in a highly corrosive environment. Thus, connections between the fuel cell stack end plate and the power bus can have high electrical resistance due to heat and corrosion at the connection locations. Power bus designs that maximize surface area contact at connection locations and which can transfer heat to the environment can lower such resistances and result in a more efficient transfer of power.

Fuel cell stacks are implemented in a wide variety of locations and in a wide variety of stack layouts. Thus a stack end plate and power bus system which offers flexibility in initial installation and subsequent modification of the orientation and location of the power bus system with respect to the stack end plate is highly desirable.

U.S. Pat. No. 5,009,968 discloses a fuel cell stack end plate structure which includes a vertically positioned rectangular box-like wall structure integral with a horizontal thin membrane end plate which, under compressive load, maintains electrical contact with the electrode.

U.S. Pat. No. 4,719,157 teaches a fuel cell stack assembly which includes a current collector plate divided into a plurality of sections. The sections are separated by a narrow gap. Terminals positioned on each section extend through an insulation layer and an end plate, where the terminals can be attached to cables to provide an electrical current for a load. The gaps between the sections allow expansion and contraction due to temperature changes in the fuel cell.

U.S. Pat. No. 4,728,585 discloses a fuel cell stack having steel end plates. A corner bracket is positioned on each corner of each end plate, and tie rods connect a corner bracket of one end plate with a corresponding corner bracket of another end plate. Load cables are positioned on the surface of the steel end plates.

U.S. Pat. No. 4,431,715 teaches an electrical generator having a plurality of elongated tubular fuel cell elements in electrical contact with an output bus.

U.S. Pat. No. 4,431,714 discloses a fuel cell assembly that includes a bipolar cooling plate. The bipolar cooling plate allows for testing of one or more fuel cells prior to assembly of an entire fuel cell stack.

U.S. Pat. No. 4,721,556 discloses a method and apparatus for an electrochemical converter having relatively thin solid-oxide electrolyte plates and interconnector plates.

U.S. Pat. No. 5,298,138 discloses a fuel cell that uses spacer elements constructed from the same material as electrolyte plates in place of interconnector plates. Using identical materials for the spacer elements and the electrolyte plates reduces problems associated with thermal expansion of dissimilar materials.

U.S. Pat. No. 5,175,062 teaches an apparatus for a fuel cell stack which reforms hydrocarbon fuel or feed stock into hydrogen gas.

None of the prior art references listed above or known to us provide a solution for achieving field modifiable current collector plates which enable a power bus to extend from any desired side of a fuel cell stack and which provide a large contact area with the end plate for lowering electrical resistance and reducing current gradients across the end plate.

SUMMARY OF THE INVENTION

It is one object of this invention to provide a fuel cell stack power bus system which enables power bus connection from any fuel cell stack side and/or any horizontal location.

It is another object of this invention to provide a fuel cell stack power bus system which achieves even current flow across the fuel cell stack end plate, even at high current densities.

It is still another object of this invention to provide a fuel cell stack power bus system which is quickly and easily field modifiable.

It is yet another object of this invention to provide a fuel cell stack power bus system which reduces material and fabrication costs.

It is still another object of this invention to provide a fuel cell stack power bus suitable for high-temperature fuel cells having improved heat dissipation characteristics.

These and other objects of this invention are achieved with a fuel cell stack power bus system which includes a plurality of current collectors mounted to a peripheral edge portion of a fuel cell stack end plate. Each current collector is in electrical contact with an adjacent current collector and ensures a large surface contact area between the current collectors and the end plate.

The current collectors are preferably detachably mounted to the peripheral edge portion of the stack end plate with conventional stainless steel threaded fasteners. To compensate for the reduction in cross-sectional area due to the hole in the current collector through which the threaded fastener extends, a washer constructed of current collector material can be positioned on each threaded fastener. End portions of some of the current collectors preferably extend linearly beyond the periphery of the fuel cell stack end plate. End portions of adjacent current collectors preferably are bent so that such end portions are approximately parallel with adjacent linearly extending end portions. A gap preferably exists between adjacent current collector end portions for mounting of a power bus. Segments of current collector material can be mounted in the gap to maintain electrical contact between adjacent current collector end portions at those locations where no power bus connection is made.

Positioning of the current collectors about the peripheral edge portion of the end plate helps ensure even current distribution through the end plate during operation at high current density. The fuel cell stack power bus system according to this invention utilizes the mechanical strength of the fuel cell stack end plate and thus can be constructed from standard bus stock rather than the significantly more expensive bus stock currently in use.

According to another preferred embodiment of this invention, a power bus is mounted with respect to the current collectors. The power bus includes a plurality of layers which are preferably constructed from the same material as the current collectors. The layers are spaced a distance from each other. Inter layer segments are mounted between the layers to conduct electric currents between the layers. The plurality of layers increase the surface area and the exchange of heat between the power bus and the surrounding environment. Because high temperature fuel cells can have temperatures in excess of 650° C. at the end plates, increased heat exchange helps reduce the bus temperature and thus the electrical resistance of the bus. The lowered resistance reduces the cross-sectional size requirements of the power bus.

According to one preferred embodiment of this invention, the power bus includes an end portion which is essentially a layered extension of the power bus. One of the layers of the power bus end portion fits within the gap maintained between adjacent current collector end portions. Additional layers of the power bus end portion abut the exterior surfaces of the current collector end portions. The current collector end portions and the power bus end portion can be fixed with respect to each other with rivets or stainless steel fasteners. Such lapped connections increase the surface contact area at the connection locations and help reduce electrical resistance, increasing the efficiency of the fuel cell stack power bus system.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
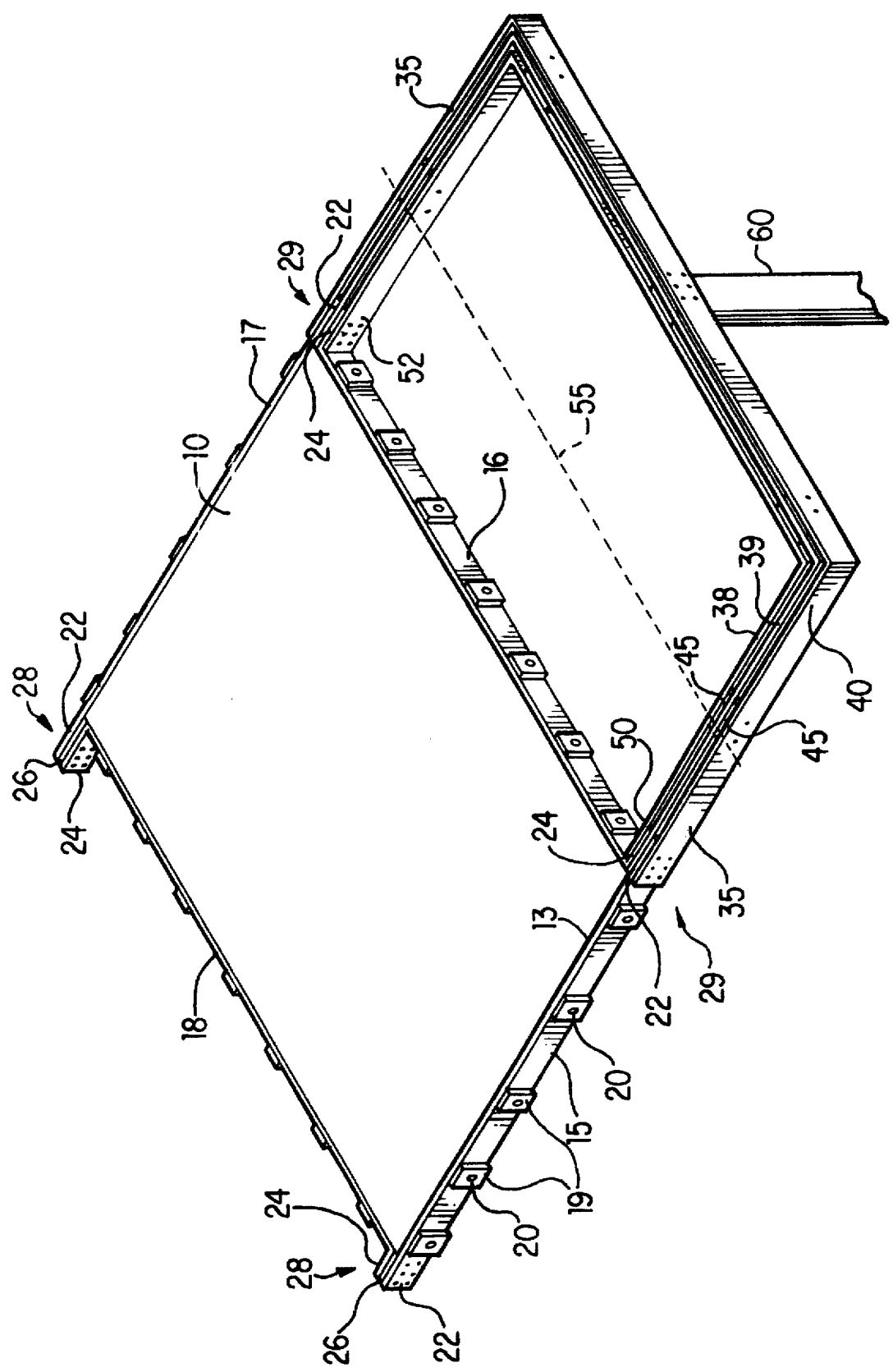
FIG. 1 is a perspective view of the fuel cell stack power bus system according to one preferred embodiment of this invention.

FIG. 1 shows a power bus system according to one preferred embodiment of this invention. For purposes of clarity stack end plate 10 is shown without any fuel cells, separator plates or compression means. Current collectors 15–18 are preferably detachably mounted to peripheral edge portion 13 with fasteners 20. Fasteners 20 can comprise stainless steel fasteners or any other suitable fasteners known to those skilled in the art. Fasteners 20 can also affix collector material 19 to the exterior surface of current collectors 15–18 to compensate for the reduction in cross-sectional area of current collectors 15–18 due to the hole through which fastener 20 extends.

Positioning current collectors 15–18 about the periphery of end plate 10 helps ensure even current distribution through end plate 10 during operation at high current density. Non-uniform current flow across the active area of a fuel cell can damage internal fuel cell active components and limit the operational life of the fuel cell stack. Current collectors 15–18 ensure nearly uniform current flow from peripheral edge portion 13 of end plate 10.

Because the mechanical strength of the fuel cell stack power bus system according to this invention is provided by end plate 10, current collectors 15–18 and power bus 35 can comprise standard bus stock such as C110 copper alloy, or other suitable, relatively low cost conductive material. Conventional power bus systems typically comprise GlidCop which is considerably more expensive than C110 alloy. Thus, the fuel cell stack power bus system according to this invention can be produced at a significantly lower cost than conventional power bus systems.

No specialized tools are required for field cutting and drilling of the copper stock used for current collectors 15–18. Thus, the fuel cell stack power bus system according to this invention can be field modified if modification of the system is necessary after shipment of the power bus to the plant site. Further, the power bus system according to this invention can be easily installed or subsequently modified to fit practically any fuel cell stack layout.

Bus connectors 28, 29 are formed from current collector end portions 22, 24. End portion 22 is a linear extension of current collector 15. End portion 24 of adjacent current collector 18 is bent to extend parallel with end portion 22. It is apparent that current collectors 15–18 can be attached to end plate 10 in such a manner that bus connectors 28, 29 can extend from any side of end plate 10. Thus, power bus 35 can be mounted to current collectors 15–18 to extend from any side of end plate 10.

Because power bus 35 is mounted to bus connectors 29, segments 26 are positioned in the gaps formed between end portion 22 and end portion 24 of bus connectors 28 to provide electric contact between current collectors 15, 18 and 17.

Power bus 35 comprises a plurality of bus layers 38–40. Although power bus 35 as shown in FIG. 1 comprises three layers, power bus 35 can comprise any suitable number of layers. Bus layers 38–40 are preferably constructed from the same material as current collectors 15–18. Temperatures at the peripheral edges of molten carbonate fuel cell stacks can obtain temperatures in excess of 650° C. Bus layers 38–40 expose a relatively large surface area of power bus 35 to the environment, and thus increase the amount of heat exchange between power bus 35 and the surrounding environment. Reducing the temperature of power bus 35 in high temperature fuel cells decreases the resistance of power bus 35 and thus increases the power available to the load.

Inter layer conductive segments 45 are preferably mounted at intervals along layers 38–40 to add rigidity to power bus 35 and to ensure even electric current flow among layers 38–40.

Bus end portions 50, 52 are preferably extensions of layers 38-40. Although FIG. 1 shows power bus 35 having two adjacent connection locations to current collectors 15-18, power bus 35 can connect to current collectors 15-18 at only one location. Power bus 35 can also connect to current collectors 15-18 at multiple connection locations which are not adjacent. As clearly shown in FIG. 1, bus end portions 50, 52 engage current collector bus connectors 29. As described previously, bus connectors 29 are formed from end portions 22, 24 of current collectors 15-18, and a gap is maintained between end portions 22, 29 for engagement with bus end portions 50, 52. The molten carbonate fuel cell stack is a high-temperature and highly corrosive environment. The overlapping connections between end portions 22, 24 and bus end portions 50, 52 increase the connection contact surface area and thus lowers electrical resistance at the location of connection of power bus 35 to current collectors 15-18.

As can be readily ascertained from FIG. 1, current collectors 15-18 can be detachably mounted to end plate 10 to provide bus connectors 28, 29 along any side of the fuel cell stack. Thus, power bus 35 can extend from any side of the fuel cell stack. Such flexibility in mounting permits rapid modification of the location of power bus 35 to accommodate connection of multiple fuel cell stacks in series and parallel circuits as necessary.

Power connection 60 can be positioned at any suitable location along power bus 35. Power connection 60 can provide the connection between power bus 35 and a flexible bus bar or flexible braid system, for example.

Dotted line 55 represents one possible location of a guard heater and/or a stack insulation wall.

I claim:

1. A fuel cell stack power bus system comprising:

a fuel cell stack end plate having a peripheral edge portion, a plurality of current collectors detachably mounted with respect to said peripheral edge portion;

each said current collector in electrical contact with an adjacent said current collector;

a bus connector in electrical contact with at least one of said current collectors; and a bus mounted to said bus connector.

2. A fuel cell stack power bus system according to claim 1, wherein each said current collector has two end portions, and a first end portion of a first said current collector and a second end portion of a second said current collector adjacent said first said current collector form said bus connector.

3. A fuel cell stack power bus system according to claim 2, wherein said first end portion and said second end portion extend generally parallel with respect to each other.

4. A fuel cell stack power bus system according to claim 2, wherein said first end portion is spaced a distance apart from said second end portion.

5. A fuel cell stack power bus system according to claim 1, wherein said bus comprises a plurality of layers of an electrical conductor, each layer spaced a distance from an adjacent layer, and a plurality of conducting members for conducting electric currents from one said layer to another said layer.

6. A fuel cell stack power bus system according to claim 1, further comprising a connection member positioned on the bus, and said connection member detachably mounted to said bus connector.

7. A fuel cell stack power bus system according to claim 6, wherein said connection member comprises a plurality of spaced apart plates.

8. A fuel cell stack power bus system comprising:

a fuel cell stack end plate having a peripheral edge portion, a current collector peripherally surrounding said peripheral edge portion, said current collector detachably mounted with respect to said peripheral edge portion;

said current collector forming at least two bus connectors; and a bus detachably mounted to said bus connector.

* * * * *